United States Patent [19]
Yazaki

[11] 3,921,185
[45] Nov. 18, 1975

[54] DIAPHRAGM ADJUSTMENT MODE SELECTING DEVICE FOR A PHOTOGRAPHIC CAMERA

[75] Inventor: Mutsunobu Yazaki, Yokohama, Japan

[73] Assignee: Canon Kabushiki Kaisha, Tokyo, Japan

[22] Filed: June 12, 1974

[21] Appl. No.: 478,750

[30] Foreign Application Priority Data
June 19, 1973 Japan............................ 48-68925

[52] U.S. Cl................................. 354/40; 354/270
[51] Int. Cl.²........................................ G03B 9/02
[58] Field of Search......... 354/38, 40, 47, 139, 145, 354/149, 270

[56] References Cited
UNITED STATES PATENTS

| | | |
|---|---|---|
| 3,056,340 | 10/1962 | Kiper .................................. 354/47 |
| 3,257,920 | 6/1966 | Greger et al. ....................... 354/149 |
| 3,512,463 | 5/1970 | Kiper .................................. 354/38 |
| 3,620,151 | 11/1971 | Kitai .................................. 354/270 |

Primary Examiner—Joseph F. Peters, Jr.
Attorney, Agent, or Firm—Toren, McGeady and Stanger

[57] ABSTRACT

A camera wherein the automatically set diaphragm adjusting means is provided with a manually set diaphragm adjustment mode selector adapted to selectively set the diaphragm adjusting means for cooperation with the focus adjusting means associated with the guide number factoring means and for operation with a flash unit requiring a particular exposure aperture. Because of such selection of diaphragm aperture adjustment modes, the camera for daylight and flash photography can be used with luminous energy controllable flash units requiring the setting of a particular exposure aperture as well as flash units having different guide numbers.

3 Claims, 4 Drawing Figures

3,921,185

DIAPHRAGM ADJUSTMENT MODE SELECTING DEVICE FOR A PHOTOGRAPHIC CAMERA

BACKGROUND OF THE INVENTION

This invention relates to cameras for daylight and flash photography, and more particularly to an automatic exposure control apparatus for controlling the effective exposure aperture provided with a manually set diaphragm adjustment mode selecting device.

There is known an automatic exposure control apparatus mounted in a camera for daylight and flash photography in selective association with an EE mechanism or electrically timed shutter of the camera to provide a range of exposure values in automatic response to the level of illumination of a subject being photographed during operation in daylight, and also in selective association with a flash-auto device provided in the camera to control the effective exposure aperture in automatic response to the focus adjustment during operation in flash light. Most of the cameras employing such an automatic exposure control apparatus generally lack manually set diaphragm devices, in order to facilitate the minimization of complexity of the structure and the management of the camera. On the other hand, recently there have become available luminous energy adjustable flash units capable of controlling the termination of energization of the flash bulb in response to the metering light reflected from the subject being photographed. Such flash units, or so-called "illumination adjustable Strobo" are designed so that the amount of flash light energy is adjusted in conformance to a particular effective exposure aperture. Therefore, the cameras mentioned above cannot be used with the Strobo of the type described, unless otherwise modified to enable manual setting of the diaphragm device for providing a particular effective exposure aperture specified for the Strobo.

SUMMARY OF THE INVENTION

Therefore it is an object of the present invention to provide a camera for daylight and flash photography which can be selectively set for operation with flash units having different guide numbers and Strobos of the type described.

Another object of the present invention is to provide a manually set diaphragm adjustment mode selecting device adapted for association with an automatic exposure control apparatus and mounted in a camera for daylight and flash photography to selectively set the camera for operation with flash units of the type described and Strobos of the type described.

Other objects and features of the present invention will be apparant from the following detailed descriptions with reference to the accompanying drawings.

DESCRIPTION OF THE PREFERRED EMBODIMENTS

Figure 1:
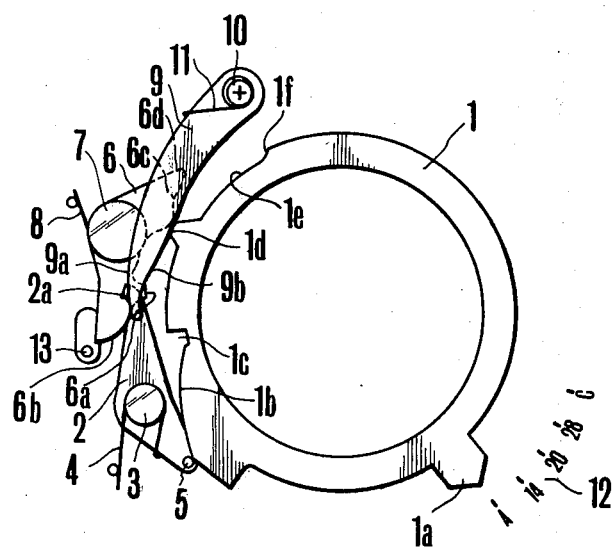
FIG. 1 is a diagrammatic front elevational view of one embodiment of the diaphragm adjustment mode selecting device according to the invention provided in a camera set for operation in daylight.
Figure 2:
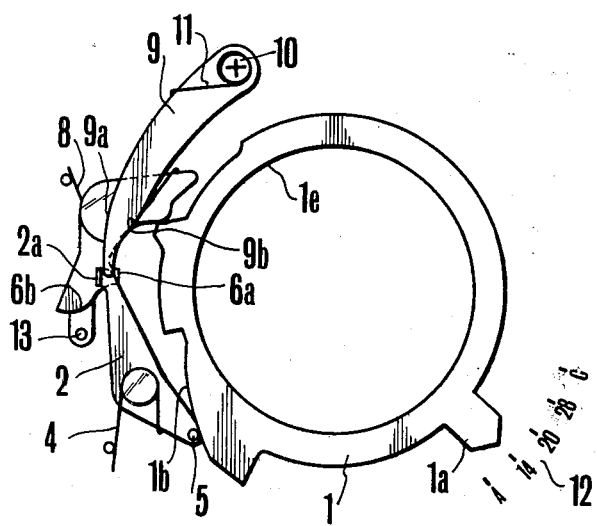
FIG. 2 is a diagrammatic front elevational view of the device of FIG. 1 in one of the operative positions for flash photography with flash units having different guide numbers.
Figure 3:
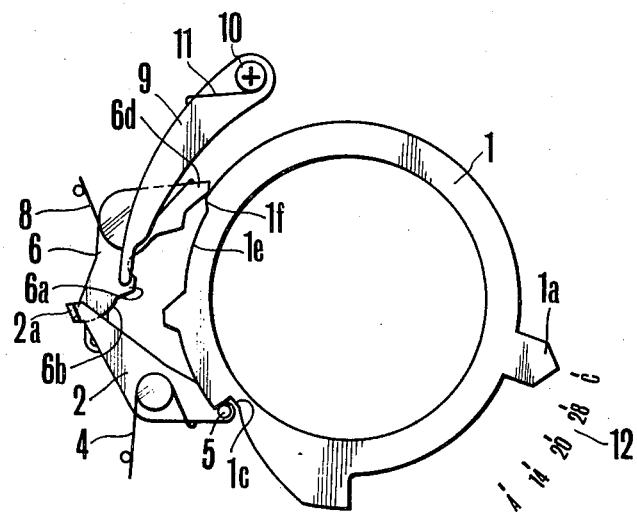
FIG. 3 is a diagrammatic front elevational view of the device of FIG. 1 in an operative position for Strobo flash photography.

Referring to FIGS. 1, 2 and 3, one embodiment of the present invention comprises a diaphragm adjustment mode selector member shaped in the form of a ring 1 which is rotatable about the optical axis of an objective lens of the camera. The ring carries an index 1a which can be placed into registry with a given symbol A or C or graduation on a fixed scale 12. The symbol A indicates that when the index 1a registers therewith, the selector ring 1 has set the camera for automatic selection of effective exposure apertures. The graduations designated by numeral characters 14, 20 and 28 indicate guide numbers for use in flash-auto photography. The symbol C indicates that the camera is set for operation with an illumination adjustable Strobo. The selector ring 1 is provided with a first cam lobe 1d, a second cam lobe 1b and a third cam lobe 1f each formed in the periphery thereof.

As shown in FIG. 1, when the selector ring is set to the position A for daylight photography, the first cam lobe 1d abuttingly engages a projection 6c extending from one arm of an automatically adjustable setting lever 6 which is fulcrumed at a pivot pin 7 and biased by a spring 8 in a clockwise direction as viewed in FIG. 1 to urge the projection 6c against the top edge of the cam lobe 1d, so that the other arm of the lever 6 is out of the area of an elongated slot through which an elongated pin 13 mounted on a diaphragm adjusting means extends. In this manner, the pin 13 is permitted to move along the entire length of the slot. In other words, the effective exposure aperture is controlled by an EE mechanism of the construction known in the art in accordance with the level of illumination of the subject as sensed photoelectrically. In abutment on the camming surface of a second cam lobe 1b is a cam follower 5 mounted on one arm of a guide number factoring lever 2 which is fulcrumed at a pivot pin 3 and biased by a spring 4 in a counter-clockwise direction.

For flash photography with flash units having different guide numbers, the operator turns the selector ring 1 from the position shown in FIG. 1 to a position shown in FIG. 2 to place the index 1a into registry with a graduation indicating the guide number of the used flash unit. The lever 2 is turned in a counter-clockwise direction in slidable engagement of the follower 5 with the camming surface 1b, thereby the angular position of the lever 2 is governed by the attitude of the camming surface 1b. At the same time, the projection 6c of the lever 6 slips down from the top edge of the first cam lobe 1b to a recessed portion 1e provided in the periphery of the selector ring 1 causing the other arm provided with a camming surface 6b formed in the end portion thereof to enter the channel of the pin 13 to select an effective exposure aperture as a function of the position of the setting lever 6. The position of the setting lever 6 is varied by the engagement of extension 6a with the edge of the tapered end portion of the lever 2 opposite to that end having the follower 5. The provision for adjusting the effective exposure aperture in conformance to the camera-to-subject distance is made in an arm 9 extending from a pivot pin 10 mounted in the focus adjusting ring not shown of the camera. The free end of the arm 9 is tapered to provide a cam projection having camming surfaces 9a and 9b for slidable engagement with the extensions 2a and 6a respectively. The parts 2a, 6a, 9a and 9b constitute a motion transmitting arrangement through which the motion of the arm 9 caused by focus adjustment is transmitted to the automatically adjustable setting lever 6, because of the stronger force of the spring 8 than that of a spring 11 which biases the arm 9 in a counter-clockwise direction. By rotation of the focus adjusting ring, therefore, the position of the arm 9 acting as an output means of the focus adjusting ring is varied with respect to the extensions 2a and 6a with variation in the position of the lever 6, while maintaining constant the position of the lever 2 in engagement of the follower 5 to the cam lobe 1b, to select an effective exposure aperture as a function of the positions of the guide number factoring lever 2 and the output arm 9, i.e., the guide number and the camera-to-subject distance. When the selector ring 1 is set from the position A to a guide number position 14, the EE mechanism is rendered inoperative so that, upon actuation of a diaphragm drive lever, the pin 13 moves along the slot and strikes the cam surface 6b. At that time the diaphragm means assumes an operative position to provide an effective exposure aperture adjusted in conformance with the selected camera-to-subject distance and the given guide number.

For flash photography with an illumination adjustable Strobo, the operator turns the selector ring 1 to place the index 1a into registry with symbol C on the scale 12 as shown in FIG. 3. The end portion 6d of the setting lever 6 is forced to slide on the third cam lobe 1f of the selector ring 1 from the recessed portion 1e, thereby the lever 6 is fixed in position to select a particular effective exposure aperture. On the other hand, the second cam lobe 1b is moved away from the cam follower 5 and the latter is caused to enter a recessed portion 1c provided in the periphery of the selector ring 1 so that the lever 2 is turned in the counter-clockwise direction to take out the extension 2a of operative relationship with the arm 9. The operation of the arm 9 does not alter the position of the lever 6 because of the motion transmitting arrangement is broken. Thus, the adjustment of effective exposure aperture to the particular value is effected regardless of the focus adjustment.

Figure 4:
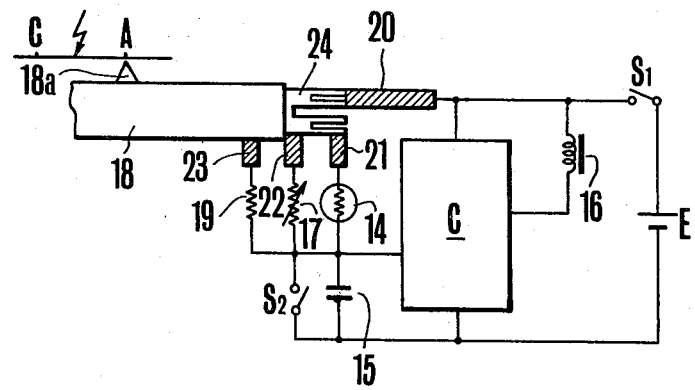
FIG. 4 is a fragmentary partly diagrammatic and partly sectional view of an automatic exposure control circuit provided with a diaphragm adjustment mode selecting device according to another embodiment of the invention.

In FIG. 4, there is shown another preferred embodiment of the diaphragm adjustment mode selecting device of the present invention adapted for association with an automatic exposure control apparatus of the type in which upon actuation of the diaphragm built-in shutter, the area of the aperture opening defined by the opened shutter blades continuously increases with time from their light blocking position and at a time after the shutter actuation which is dependent upon the level of illumination of the subject sensed by a sensor constituting part of a time constant circuit. An electronic switching circuit associated with the time constant circuit actuates the initiation of energization of an electromagnet causing the closure of the shutter blades, thereby simultaneous adjustment of the exposure time and the effective exposure aperture being effected and thereupon the synchronous switch for the flash unit being closed in synchronism with initiation of closing of the shutter blades.

The automatic exposure control apparatus shown in FIG. 4 comprises a switching circuit C, an electromagnet 16, a power source E, a main switch $S_1$ and a switch $S_2$. When a diaphragm adjustment mode selector ring 18 having an index 18a is set in the illustrated position wherein the index 18a registers with the symbol A, a terminal 20 of the switching circuit C is connected through a conductive slide 24 mounted on the selector 18 to a terminal 21 of a sensor 14 such as cadmium sulfide photoconductive element to form a time constant circuit together with a condenser 15 connected to the switching circuit C. Upon depression of a shutter button, the main switch $S_1$ is closed to actuate the operation of the shutter control mechanism, and at the same time, the trigger switch $S_2$ is opened to charge the condenser 15 through the sensor 14. When the charge stored on the condenser 15 has reached a predetermined level, the switching circuit is actuated to energize the electromagnet 16, thereby the shutter is closed to effect a correct exposure.

For flash-auto photography with flash units having guide numbers, the operator turns the selector ring 18 to place the index 18a into registry with a thunderbolt symbol, the slider 24 interconnects the terminal 20 and a terminal of a variable resistor 17 connected to the condenser 15, thereby the terminal 21 of the sensor 14 is disconnected from the terminal 20. The resistance value of the variable resistor 17 is controlled in accordance with the guide number and camera-to-subject distance. In this arrangement, the exposure interval is controlled by the time constant circuit comprising the variable resistor 17 and the condenser 15. Upon actuation of the switching circuit the electromagnet 16 is energized to release the shutter blade holding member and simultaneously the synchronous switch for the flash unit is closed to energize the flash unit. At this moment, the area of the aperture opening reaches a level corresponding to the selected guide number.

For flash photography with an illumination-adjustable Strobo, the operator turns the selector ring 18 to place the index 18a in registry with the symbol C. The slider 24 interconnects the terminal 20 and a terminal 23 of a fixed resistor 19, thereby the terminal 22 of the variable resistor 17 is disconnected from the terminal 20. The resistor 19 is selected to have a resistance value such that the time constant circuit comprising the resistor 19 and the condenser 15 adjusts the ultimate area of the aperture opening to a level specified for the used Strobo. When the area of the aperture opening has reached the specified level, the Strobo is triggered and the amount of flash energy emitted is controlled by the flash energy control device of the Strobo itself, thereby a correct exposure is effected.

It will be thus understood that the present invention provides a diaphragm adjustment mode selecting device of simple structure adapted for use in a camera for daylight and flash photography employing the above outlined automatic exposure control apparatus and the flash auto device for flash units having guide numbers. This enables operator to use an otherwise designed flash unit such as an illumination-adjustable Strobo without the particular necessity of providing a manually set diaphragm device in the camera. The invention has been described above in connection with purely schematic examples which can be modified in many ways. For example, in order to factor the film sensitivity to the exposure value, in stead of a fixed scale 12, it is possible to use a shiftable scale carrying only the guide number graduations and positioned adjacent a film speed scale.

What is claimed is:

1. In a camera for operation in daylight and artificial light, an automatic exposure control apparatus for controlling the effective exposure aperture in automatic response to the level of illuminance of a subject being photographed as sensed photoelectrically comprising:

diaphragm means arranged to provide a range of effective exposure apertures;

a diaphragm adjustment mode selector member movable between a plurality of positions, one position being indicative of automatic selection of effective exposure apertures for daylight photography, one position being indicative of a particular effective exposure aperture for special flash photography, and the remaining positions being indicative of different guide numbers for flash-auto photography;

guide number factoring means arranged to engage said selector member upon movement of said selector member between said positions thereof to assume the corresponding positions;

focus adjusting means including output means arranged to operatively engage said guide number factoring means at least when said selecting member is set to one of the flash-auto photography positions; and automatically adjustable setting means for said diaphragm means being arranged to permit the diaphragm means to operate throughout the entire dynamic range thereof when said selector member is set in the daylight photography position, to select an effective exposure aperture as a function of the positions of said guide number factoring means and said output means when said selector member is set in one of the flash-auto photography positions, and to select the particular effective exposure aperture when said selector member is set in the special flash photography position.

2. An automatic exposure control apparatus according to claim 1, wherein said selector member is provided with a first cam arranged upon engagement with said automatically adjustable setting means for permitting said diaphragm means to operate throughout the entire dynamic range thereof, with a second cam for slidable engagement with said guide number factoring means during the flash-auto photography adapted upon movement of said selector member between the flash-auto positions thereof to control the position of said factoring means, and a third cam upon engagement with said setting means, for holding it in a position for providing the particular effective exposure aperture.

3. An automatic exposure control apparatus according to claim 2, wherein said guide number factoring means, said output means and said automatically adjustable setting means are provided with motion transmitting means by means of which the motion of the output means caused by focus adjustment is transmitted to said setting means while said factoring means remains stationary in abutting engagement with the camming surface of said second cam during the operation of said focus adjusting means, thereby said setting means assumes a position to select an effective exposure aperture as a function of the camera-to-subject distance and the given guide number.

* * * * *